UNITED STATES PATENT OFFICE.

DAVIS BRIZZOLARI, OF MADISONVILLE, TEXAS.

WHITEWASH.

SPECIFICATION forming part of Letters Patent No. 401,122, dated April 9, 1889.

Application filed January 3, 1889. Serial No. 295,310. (No specimens.)

*To all whom it may concern:*

Be it known that I, DAVIS BRIZZOLARI, a citizen of the United States of America, residing at Madisonville, in the county of Madison and State of Texas, have invented a certain new and useful Improvement in Whitewash, of which the following is a specification, reference being had therein to the accompanying drawings.

My improvement in whitewash-paint consists in the use of certain ingredients whereby the same is rendered more permanent or durable and beautiful in color than any other article of the kind hitherto produced, substantially as hereinafter more fully described.

In preparing my whitewash-paint I take the leaves of the cactus-plant and macerate the same by any ordinary means into a pulp, and from thence filter half-pint of the liquid thus produced; but I do not confine myself to maceration in order to obtain the vegetable essence or salt of the cactus-plant, as it may also be macerated and then boiled down to the consistency of the juice of the plant without evaporation of the salt. The vegetable salt of the cactus has a wonderful effect, in combination with the other component parts of the compound, on application of the whitewash and evaporation of the fluid therefrom, not only of hardening the whitewash and rendering it impervious to water, but also of improving its color and luster. I then take five pounds of slaked lime and five quarts of water, which I thoroughly blend and permit to stand for twenty minutes. I then take four dozen eggs, which I beat up together thoroughly in a vessel apart, and these I then pour into the lime and water and mix them well together for about ten minutes. I then to this mixture add and stir therein not less than five pints of the liquid formed, as aforesaid, from leaves of the cactus.

This mixture, when applied as a paint or wash, after it has become thoroughly dried, is not brittle, as ordinary whitewash, and is impervious to moisture and becomes harder and more durable by the action of the elements thereon.

I claim—

A whitewash-paint composed of the cactus-plant, lime, eggs, and water thoroughly intermingled and in about the quantities substantially as described.

In testimony whereof I affix my signature in presence of two witnesses.

DAVIS BRIZZOLARI.

Witnesses:
 W. M. IMBODEN,
 J. C. MORRIS.